(12) United States Patent
Warner

(10) Patent No.: US 8,275,671 B2
(45) Date of Patent: *Sep. 25, 2012

(54) VALIDATING E-COMMERCE TRANSACTIONS

(75) Inventor: Neil Warner, Chandler, AZ (US)

(73) Assignee: Go Daddy Operating Company, LLC, Scottsdale, AZ (US)

(*) Notice: Subject to any disclaimer, the term of this patent is extended or adjusted under 35 U.S.C. 154(b) by 173 days.

This patent is subject to a terminal disclaimer.

(21) Appl. No.: 12/619,048

(22) Filed: Nov. 16, 2009

(65) Prior Publication Data

US 2010/0057631 A1    Mar. 4, 2010

Related U.S. Application Data

(63) Continuation of application No. 12/033,662, filed on Feb. 19, 2008, now Pat. No. 7,653,577.

(51) Int. Cl.
*G06Q 30/00* (2006.01)

(52) U.S. Cl. ............... 705/26.41; 705/26.1; 705/26.82; 705/27.1

(58) Field of Classification Search ............... 705/26, 705/27

See application file for complete search history.

(56) References Cited

U.S. PATENT DOCUMENTS

| | | | |
|---|---|---|---|
| 6,247,047 B1 | 6/2001 | Wolff | |
| 6,332,158 B1 | 12/2001 | Risley et al. | |
| 6,560,634 B1 | 5/2003 | Broadhurst | |
| 6,745,248 B1 | 6/2004 | Gardos et al. | |
| 6,856,963 B1 | 2/2005 | Hurwitz | |
| 6,880,007 B1 | 4/2005 | Gardos et al. | |
| 7,072,944 B2 | 7/2006 | Ladonde et al. | |
| 7,080,049 B2 | 7/2006 | Truitt et al. | |
| 7,231,659 B2* | 6/2007 | Trilli et al. | 726/3 |
| 7,959,074 B1* | 6/2011 | Chopra et al. | 235/380 |
| 2002/0026439 A1 | 2/2002 | Monroe | |
| 2002/0065903 A1 | 5/2002 | Fellman | |
| 2002/0091703 A1 | 7/2002 | Bayles | |
| 2002/0091827 A1 | 7/2002 | King | |
| 2002/0129013 A1 | 9/2002 | Thomas | |
| 2004/0169678 A1 | 9/2004 | Oliver | |
| 2004/0172340 A1 | 9/2004 | Bishop et al. | |
| 2004/0181665 A1* | 9/2004 | Houser | 713/158 |
| 2004/0199520 A1 | 10/2004 | Ruiz | |
| 2005/0071741 A1 | 3/2005 | Acharya et al. | |
| 2005/0289242 A1 | 12/2005 | Ruiz | |
| 2006/0009994 A1 | 1/2006 | Hogg et al. | |
| 2006/0015472 A1 | 1/2006 | Ahlander et al. | |
| 2006/0015722 A1 | 1/2006 | Rowan et al. | |
| 2006/0069697 A1 | 3/2006 | Shraim et al. | |
| 2006/0095404 A1 | 5/2006 | Adelman et al. | |
| 2006/0095586 A1 | 5/2006 | Adelman et al. | |

(Continued)

OTHER PUBLICATIONS

Dec. 14, 2009 non-final office action in related U.S. Appl. No. 12/033,629.

(Continued)

*Primary Examiner* — Robert M. Pond
(74) *Attorney, Agent, or Firm* — Karl A. Fazio

(57) ABSTRACT

Methods of the present invention allow for validating eCommerce transactions. An exemplary method for validating an eCommerce transaction may comprise the steps of validating a Hosting Provider, validating a Merchant using the Hosting Provider to host an eCommerce website, and validating a Customer who may purchase goods or services from the Merchant via the eCommerce website. If the Hosting Provider, Merchant, and Customer are validated, an eCommerce transaction may be approved.

11 Claims, 7 Drawing Sheets

U.S. PATENT DOCUMENTS

| | | | |
|---|---|---|---|
| 2006/0106793 A1 | 5/2006 | Liang | |
| 2006/0116957 A1 | 6/2006 | May et al. | |
| 2006/0200487 A1 | 9/2006 | Adelman et al. | |
| 2006/0206572 A1 | 9/2006 | Ladonde et al. | |
| 2006/0235824 A1 | 10/2006 | Cheung et al. | |
| 2006/0253458 A1* | 11/2006 | Dixon et al. | 707/10 |
| 2006/0259320 A1 | 11/2006 | LaSalle et al. | |
| 2006/0271668 A1 | 11/2006 | Parsons et al. | |
| 2007/0208940 A1 | 9/2007 | Adelman et al. | |
| 2008/0021890 A1 | 1/2008 | Adelman et al. | |
| 2008/0022013 A1 | 1/2008 | Adelman et al. | |
| 2008/0028100 A1 | 1/2008 | Adelman et al. | |
| 2008/0028443 A1 | 1/2008 | Adelman et al. | |
| 2008/0052183 A1 | 2/2008 | Hobson | |
| 2008/0143548 A1 | 6/2008 | Grimmelmann et al. | |
| 2008/0183551 A1 | 7/2008 | Jain | |
| 2008/0270209 A1 | 10/2008 | Mauseth et al. | |
| 2008/0275748 A1 | 11/2008 | John | |
| 2008/0288299 A1 | 11/2008 | Schultz | |
| 2008/0301055 A1 | 12/2008 | Borgs et al. | |

OTHER PUBLICATIONS

Applicant's Jan. 28, 2010 reply to Dec. 14, 2009 non-final office action in related U.S. Appl. No. 12/033,629.

Apr. 7, 2010 non-final office action in related U.S. Appl. No. 12/033,629.

Apr. 7, 2010 response to Apr. 7, 2010 non-final office action in related U.S. Appl. No. 12/033,629.

Jun. 17, 2010 non-final office action in related U.S. Appl. No. 12/033,629.

Aug. 24, 2010 response to Jun. 17, 2010 non-final office action in related U.S. Appl. No. 12/033,629.

Golbeck and Hendler. Reputation Network Analysis for Email Filtering. http://www.ceas.cc/papers-2004/177.pdf. Jul. 2004.

Reputation-Based Mail Flow Control. IronPort Systems, Inc. http://www.ironport.com/pdf/ironport_c60_rep_based_paper.pdf.

Hitlin and Rainie, Pew Internet Project Data Memo. http://www.pewinternet.org/pdfs/PIP_Datamemo_Reputation.pdf.

Payment Card Industry (PCI) Data Security Standard—Requirements and Security Assessment Procedures, Version 1.2, Oct. 2008.

Non-final action dated Apr. 7, 2009 in related U.S. Appl. No. 12/033,662.

Applicant's reply dated Apr. 16, 2009 to non-final action dated Apr. 7, 2009 in related U.S. Appl. No. 12/033,662.

Final action dated Jul. 31, 2009 in related U.S. Appl. No. 12/033,662.

Applicant's reply dated Jul. 31, 2009 to final action dated Jul. 31, 2009 in related U.S. Appl. No. 12/033,662.

Non-final action dated Nov. 16, 2009 in related U.S. Appl. No. 12/033,662.

Applicant's reply dated Nov. 16, 2009 to non-final action dated Nov. 16, 2009 in related U.S. Appl. No. 12/033,662.

Advisory Action dated Aug. 12, 2009 in related U.S. Appl. No. 12/033,662.

Applicant's Aug. 12, 2009 Request for Continued Examination in related U.S. Appl. No. 12/033,662.

Nov. 18, 2010 Notice of Allowance in related U.S. Appl. No. 12/033,629.

"ValiCert Ships Third-Generation Validation Authority Solution," PR Newswire, New York: Oct. 18, 1999, pp. 1-4.

Dec. 2, 2009 Notice of Allowance in related U.S. Appl. No. 12/033,622.

* cited by examiner

VALIDATING E-COMMERCE TRANSACTIONS

CROSS REFERENCE TO RELATED PATENT APPLICATIONS

This patent application is a continuation of U.S. patent application Ser. No. 12/033,662 to Neil Warner, with filing date Feb. 19, 2008 and entitled "VALIDATING E-COMMERCE TRANSACTIONS" (issued as U.S. Pat. No. 7,653,577 on Jan. 26, 2010), priority from which is hereby claimed.

This patent application is also related to U.S. patent application Ser. No. 12/033,629 to Neil Warner, with filing date Feb. 19, 2008 and entitled "RATING E-COMMERCE TRANSACTIONS" (issued as U.S. Pat. No. 7,860,755 on Dec. 28, 2010).

The subject matter of all patent applications is commonly owned and assigned to Go Daddy Operating Company, LLC. All prior applications are incorporated herein in their entirety by reference.

FIELD OF THE INVENTION

The present inventions generally relate to the field of business transactions conducted over the Internet and, more specifically, methods for rating and validating eCommerce transactions.

BACKGROUND OF THE INVENTION

A network is a collection of links and nodes (e.g., multiple computers and/or other devices connected together) arranged so that information may be passed from one part of the network to another over multiple links and through various nodes. Examples of networks include the Internet, the public switched telephone network, the global Telex network, computer networks (e.g., an intranet, an extranet, a local-area network, or a wide-area network), wired networks, and wireless networks.

The Internet is a worldwide network of computers and computer networks arranged to allow the easy and robust exchange of information between computer users. Hundreds of millions of people around the world have access to computers connected to the Internet via Internet Service Providers (ISPs). Content providers place multimedia information (e.g., text, graphics, audio, video, animation, and other forms of data) at specific locations on the Internet referred to as webpages. Websites comprise a collection of connected, or otherwise related, webpages. The combination of all the websites and their corresponding webpages on the Internet is generally known as the World Wide Web (WWW) or simply the Web.

Prevalent on the Web are multimedia websites, some run by Merchants, offering and selling goods and services to individuals and organizations (i.e., potential Customers). Websites may consist of a single webpage, but typically consist of multiple interconnected and related webpages. Websites, unless extremely large and complex or have unusual traffic demands, typically reside on a single server and are prepared and maintained by a single individual or entity. Menus and links may be used to move between different webpages within the website or to move to a different website as is known in the art. The interconnectivity of webpages enabled by the Internet can make it difficult for Internet users to tell where one website ends and another begins.

Websites may be created using HyperText Markup Language (HTML) to generate a standard set of tags that define how the webpages for the website are to be displayed. Users of the Internet may access content providers' websites using software known as an Internet browser, such as MICROSOFT INTERNET EXPLORER or MOZILLA FIREFOX. After the browser has located the desired webpage, it requests and receives information from the webpage, typically in the form of an HTML document, and then displays the webpage content for the user. The user then may view other webpages at the same website or move to an entirely different website using the browser.

Browsers are able to locate specific websites because each website, resource, and computer on the Internet has a unique Internet Protocol (IP) address. Presently, there are two standards for IP addresses. The older IP address standard, often called IP Version 4 (IPv4), is a 32-bit binary number, which is typically shown in dotted decimal notation, where four 8-bit bytes are separated by a dot from each other (e.g., 64.202.167.32). The notation is used to improve human readability. The newer IP address standard, often called IP Version 6 (IPv6) or Next Generation Internet Protocol (IPng), is a 128-bit binary number. The standard human readable notation for IPv6 addresses presents the address as eight 16-bit hexadecimal words, each separated by a colon (e.g., 2EDC:BA98:0332:0000:CF8A:000C:2154:7313).

IP addresses, however, even in human readable notation, are difficult for people to remember and use. A Uniform Resource Locator (URL) is much easier to remember and may be used to point to any computer, directory, or file on the Internet. A browser is able to access a website on the Internet through the use of a URL. The URL may include a Hypertext Transfer Protocol (HTTP) request combined with the website's Internet address, also known as the website's domain name. An example of a URL with a HTTP request and domain name is: http://www.companyname.com. In this example, the "http" identifies the URL as a HTTP request and the "companyname.com" is the domain name.

Domain names are much easier to remember and use than their corresponding IP addresses. The Internet Corporation for Assigned Names and Numbers (ICANN) approves some Generic Top-Level Domains (gTLD) and delegates the responsibility to a particular organization (a "registry") for maintaining an authoritative source for the registered domain names within a TLD and their corresponding IP addresses. For certain TLDs (e.g., .biz, .info, .name, and .org) the registry is also the authoritative source for contact information related to the domain name and is referred to as a "thick" registry. For other TLDs (e.g., .com and .net) only the domain name, registrar identification, and name server information is stored within the registry, and a registrar is the authoritative source for the contact information related to the domain name. Such registries are referred to as "thin" registries. Most gTLDs are organized through a central domain name Shared Registration System (SRS) based on their TLD.

Some Internet users, typically those that are larger and more sophisticated, may provide their own hardware, software, and connections to the Internet. But many Internet users either do not have the resources available or do not want to create and maintain the infrastructure necessary to host their own websites. To assist such individuals (or entities), hosting companies exist that offer website hosting services. These Hosting Providers typically provide the hardware, software, and electronic communication means necessary to connect multiple websites to the Internet. A single Hosting Provider may literally host thousands of websites on one or more hosting servers.

Websites allow individuals and businesses to share their information and conduct business with a large number of Internet users. Many products and services are offered for sale on the Internet, thus elevating the Internet to an essential tool of commerce. Merchants, whether large corporations, small corporations, or individuals, are rapidly creating websites to take advantage of the growing number of Customers using the Internet and customers' increasing willingness to purchase goods and services over the Web. Websites created by Internet businesses may be reached by millions of Internet savvy customers, thereby allowing Internet businesses to offer their products and services to a very large pool of potential Customers.

For Internet users and businesses alike, the Internet continues to be increasingly valuable. More people use the Web for everyday tasks, from social networking, shopping, banking, and paying bills to consuming media and entertainment. eCommerce (i.e., buying and selling products or services over electronic systems such as the Internet) is growing, with businesses delivering more services and content across the Internet, communicating and collaborating online, and inventing new ways to connect with each other.

At least three distinct entities are involved in any eCommerce transaction conducted via a website: a Merchant; a Customer; and the Hosting Provider hosting the Merchant's website. During the eCommerce transaction, each of these entities has access to information about the other entities that may allow for fraud. For example, a fraudulent Merchant and/or Hosting Provider may engage in phishing (i.e., fraudulently acquiring sensitive information, such as usernames, passwords and credit card details, by masquerading as a trustworthy entity in an electronic communication), and a fraudulent Customer may attempt to use an unauthorized credit card. It is therefore important that each entity involved in an eCommerce transaction be trusted by the other entities.

Applicant, however, has noticed that presently-existing methods do not provide adequate means for entities involved in eCommerce transactions to determine whether sufficient trust levels exists to proceed with a transaction. For the foregoing reasons, there is a need for the methods of rating and validating eCommerce transactions and related functionality as described herein.

SUMMARY OF THE INVENTION

The limitations cited above and others are substantially overcome through the methods disclosed herein, which allow for rating and validating eCommerce transactions.

An exemplary method for rating an eCommerce transaction may comprise the steps of identifying a plurality of data indicating the trustworthiness of a Hosting Provider, Merchant, and/or Customer, collecting the data, and generating a Transaction Trust Rating for an eCommerce transaction, with the Transaction Trust Rating being based upon the collected data. The Transaction Trust Rating may be stored in a Repository accessible to Internet users. A Transaction Trust Rating Indicator (indicative of the Transaction Trust Rating) may be provided to the Hosting Provider, Merchant, and/or Customer and may take the form of a certificate for display on a webpage, a change in color of an address bar on a browser, and/or an alphanumeric ranking.

An exemplary method for validating an eCommerce transaction may comprise the steps of validating a Hosting Provider, validating a Merchant using the Hosting Provider to host an eCommerce website, validating a Customer who may purchase goods or services from the Merchant via the eCommerce website, and (if the Hosting Provider, Merchant, and Customer are validated) approving an eCommerce transaction involving the Hosting Provider, Merchant, and/or Customer.

The above features and advantages of the present invention will be better understood from the following detailed description taken in conjunction with the accompanying drawings.

DETAILED DESCRIPTION

Figure 1:
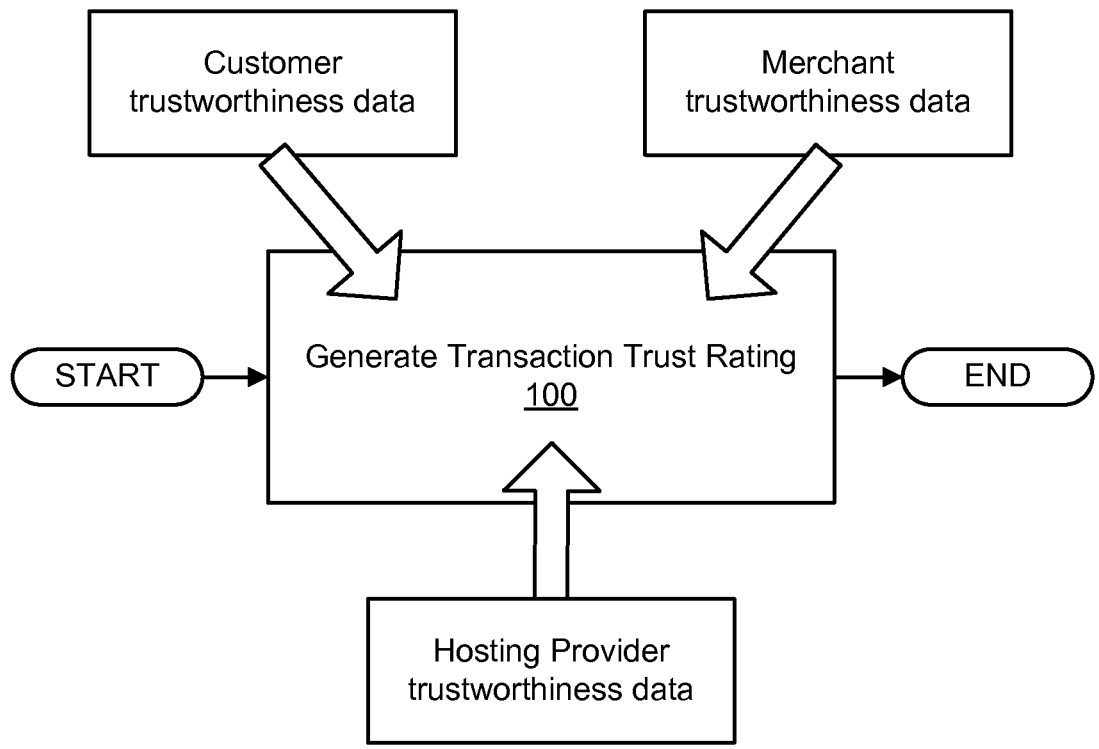
FIG. 1 is a flow diagram illustrating a possible embodiment of a method for rating eCommerce Transactions.

The present inventions will now be discussed in detail with regard to the attached drawing figures which were briefly described above. In the following description, numerous specific details are set forth illustrating the Applicant's best mode for practicing the invention and enabling one of ordinary skill in the art to make and use the invention. It will be obvious, however, to one skilled in the art that the present invention may be practiced without many of these specific details. In other instances, well-known machines, structures, and method steps have not been described in particular detail in order to avoid unnecessarily obscuring the present invention. Unless otherwise indicated, like parts and method steps are referred to with like reference numerals.

Rating eCommerce Transactions

An exemplary method for rating an eCommerce transaction is illustrated in FIG. 1. In this example embodiment, a Transaction Trust Rating for an eCommerce transaction is generated (Step 100). The Transaction Trust Rating is an indicator of the overall trustworthiness of a potential e-Commerce transaction, which may comprise any transaction involving the sale or purchase of goods or services over the Internet. At least three distinct entities may be involved in any such eCommerce transaction: a Merchant; a Customer; and the Hosting Provider hosting the Merchant's website.

A Merchant may be any individual, entity, business, organization, and/or governmental entity selling goods or services, perhaps via an eCommerce website accessible to potential Customers over the Internet. A Hosting Provider may host the Merchant's eCommerce website, perhaps on a server. As non-limiting examples, the server could be an application, communication, mail, database, proxy, fax, file, media, web, peer-to-peer, or standalone server and may use any server format known in the art or developed in the future (possibly a shared hosting server, a virtual dedicated hosting server, a dedicated hosting server, or any combination thereof). The Hosting Provider may comprise any individual, entity, automated system, domain name registrar, domain name registry, reseller of a domain name registrar, Internet service provider, website operator, and/or any combination thereof. A Customer may be any individual, entity, business, organization, and/or governmental entity who may purchase goods or services, perhaps via a Merchant's eCommerce website. The embodiments described herein place no limitation upon the goods or services that may form the basis of an eCommerce transaction.

The Transaction Trust Rating may be based upon a plurality of data indicating the trustworthiness of the Hosting Provider, Merchant, and/or Customer. Data indicative of trustworthiness may include, but is not limited to, data indicative of whether a Hosting Provider satisfies the Payment Card Industry Data Security Standard. The Payment Card Industry Data Security Standard (PCI DSS) was developed by the major credit card companies as a guideline to help organizations that process card payments to prevent credit card fraud, hacking, and/or other security threats. A company processing, storing, or transmitting payment card data must be PCI DSS compliant or risk losing their ability to process credit card payments and being audited and/or fined. Merchants must validate their compliance periodically. Alternatively, the data may be indicative of the Hosting Provider's computer system's security, such as whether they have been infiltrated and used by known spammers and/or phishers.

The reputation of a Merchant's domain name and/or website also may be relevant trustworthiness data. Whether a Merchant's website is Secure Sockets Layer (SSL)-certified, for example, may indicate whether the Merchant has been verified as the authorized controller of the website's domain name, is currently registered with a government authority, and/or legally exists as an incorporated corporation. SSL certificates are usually displayed on a Merchant's website and typically indicate that the Merchant's website utilizes at least some level of secure communications protocol. Relevant trustworthiness data also may comprise a Customer's purchase history, whether a Customer is authorized to use a credit card, and/or a Customer's eCommerce reputation. Any additional data known in the art or identified in the future that is indicative of the trustworthiness of a Hosting Provider, Merchant, and/or Customer also may be used.

Any method of generating a Transaction Trust Rating based on the above-described plurality of data may be used. As a non-limiting example, the illustrated method may utilize mathematical algorithms that generate a Transaction Trust Rating based on an average (weighted or non-weighted) of numerical trustworthiness values assigned to each of the plurality of data. Data possessing stronger indicia of trustworthiness may be given more weight than others. Alternatively, the Transaction Trust Rating may comprise the sum of the values assigned to the individual data points. Such mathematical algorithms may be executed by a computer processor following software-embodied instructions. Importantly, a Transaction Trust Rating may be generated even when data indicating the trustworthiness of all three entities is unavailable. If trustworthiness data is unavailable for any entity, the generation step (Step 100) may proceed with only the available data.

Figure 2:
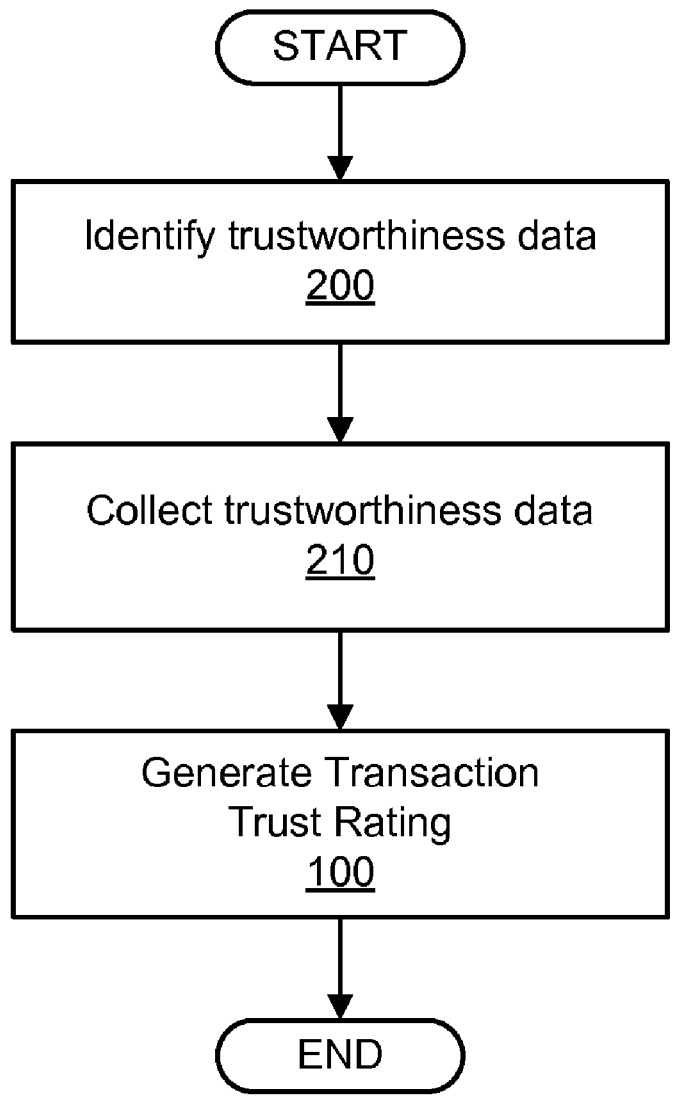
FIG. 2 is a flow diagram illustrating a possible embodiment of a method for rating eCommerce Transactions.

A more detailed method for rating eCommerce transactions is illustrated in FIG. 2. In addition to the steps illustrated in FIG. 1, this example embodiment may include the steps of identifying (Step 200) and collecting (Step 210) the plurality of data indicating the trustworthiness of the Hosting Provider, Merchant, and/or Customer. Such data may be identified and collected by analyzing, as non-limiting examples, the steps taken by the Hosting Provider to become an eCommerce provider (e.g., meeting the Payment Card Industry Data Security Standard, becoming a domain name registry or registrar, becoming authorized to sell SSL-certificates), steps taken by the Merchant to establish his business (e.g., registering a domain name or developing a website), and/or a Customer's eCommerce history.

Internal information about the Hosting Provider, such as IP address used, results of internal and external scans, security team availability, and system log data, are all types of information that may be collected. As a non-limiting example, data points provided by organizations such as SHADOW SERVER and/or TEAM CYMRU may be used to identify infected systems within the Hosting Provider. If the Merchant has registered a domain name, a domain name validation analysis (such as GODADDY.COM's CERTIFIED DOMAIN) may be completed to identify the individual or entity that registered the domain name and determine their reputation. The domain name registrant also may be validated via credit card fraud detection. Whether the Merchant's eCommerce website is SSL-certified is yet another data point that may be collected. With regard to Customer data, his purchase history (from the subject Merchant and others) may be identified and collected. Credit card fraud detection may be used to determine whether the Customer is authorized to use a credit card. The IP addresses of the Customer's personal computers also may be obtained and compared with known comprised personal computers to establish a data point to warn the Merchant of possible malicious activity.

Figure 3:
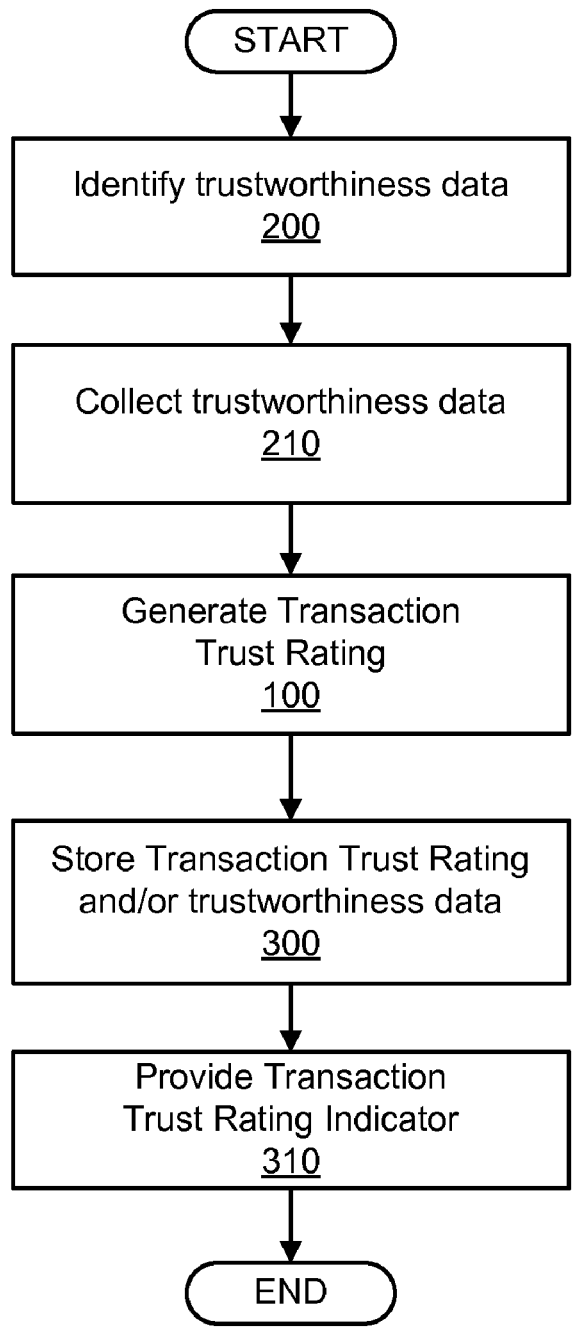
FIG. 3 is a flow diagram illustrating a possible embodiment of a method for rating eCommerce Transactions.

A more detailed method for rating eCommerce transactions is illustrated in FIG. 3. In addition to the steps illustrated in FIG. 2, this example embodiment may include the steps of storing the Transaction Trust Rating (indicating the Transaction Trust Rating) and/or the plurality of trustworthiness data in a Repository (Step 300) and providing a Transaction Trust Rating Indicator to the Hosting Provider, Merchant, and/or Customer (Step 310). The Repository may comprise, as non-limiting examples, a magnetic storage device, disk drive, FLASH or RAM memory, local database, online database, desktop database, server-side database, relational database, hierarchical database, network database, object database, object-relational database, associative database, concept-oriented database, entity-attribute-value database, multi-dimensional database, semi-structured database, star schema database, XML database, file, collection of files, spreadsheet, and/or other means of data storage located on a server, a computer, a client, or any other storage device. As a specific example, the Repository may comprise a Trust Rating Database that is accessible to any Internet User via the Internet. Merchants, Customers, Hosting Providers, and/or any other Internet user may access the database, review the Transaction Trust Rating and/or the plurality of trustworthiness data, and decide whether sufficient trust exists to proceed with the transaction. Alternatively, a Transaction Trust Rating Indicator (indicating the Transaction Trust Rating) may be provided to the Hosting Provider, Merchant, and/or Customer (Step 310). As non-limiting examples, the Transaction Trust Rating Indicator may comprise a marker for display on a website that may represent the Transaction Trust Rating as an alpha-numeric score, a grade (e.g., A-F), a color on a spectrum (e.g., green to red, with green representing trustworthiness and red representing lack of trustworthiness), a number of stars, a certificate for display on a webpage, and/or a change in color of an address bar on a browser. Any other means of indicating a level of trustworthiness that is known in the art or developed in the future also may be used as a Transaction Trust Rating Indicator.

The Transaction Trust Rating Indicator may be provided to the recipient via any means of transferring data known in the art or developed in the future. Such methods can generally be classified in two categories: (1) "pull-based" data transfers where the receiver initiates a data transmission request; and (2) "push-based" data transfers where the sender initiates a data transmission request. Both types are expressly included in the embodiments illustrated herein, which also may include transparent data transfers over network file systems, explicit file transfers from dedicated file-transfer services like FTP or HTTP, distributed file transfers over peer-to-peer networks, file transfers over instant messaging systems, file transfers between computers and peripheral devices, and/or file transfers over direct modem or serial (null modem) links, such as XMODEM, YMODEM and ZMODEM. Data streaming technology also may be used to effectuate data transfer. A data stream may be, for example, a sequence of digitally encoded coherent signals (packets of data) used to transmit or receive information that is in transmission. Any data transfer protocol known in the art or developed in the future may be used including, but not limited to: (1) those used with TCP/IP (e.g., FTAM, FTP, HTTP, RCP, SFTP, SCP, or FASTCopy); (2) those used with UDP (e.g., TFTP, FSP, UFTP, or MFTP); (3) those used with direct modem connections; (4) HTTP streaming; (5) Tubular Data Stream Protocol (TDSP); (6) Stream Control Transmission Protocol (SCTP); and/or (7) Real Time Streaming Protocol (RTSP).

Figure 4:
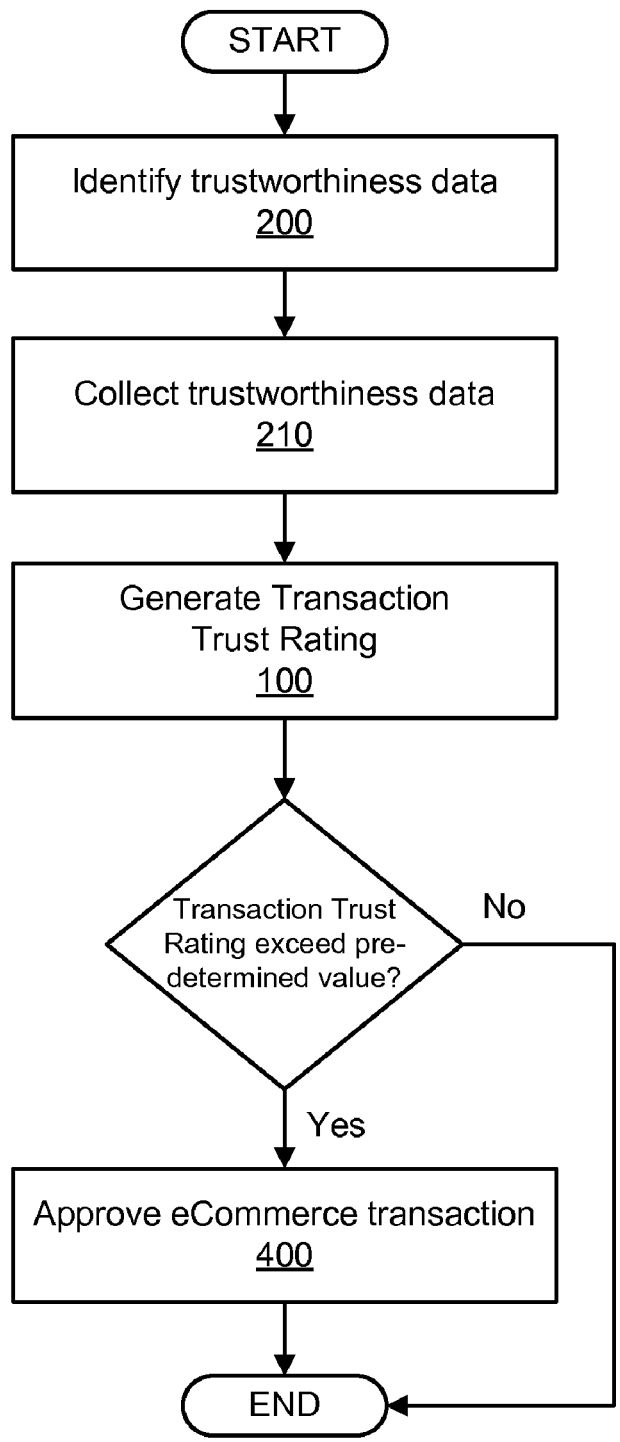
FIG. 4 is a flow diagram illustrating a possible embodiment of a method for rating and validating eCommerce Transactions.

In the embodiment illustrated in FIG. 4, an eCommerce transaction is approved (Step 400) if the Transaction Trust Rating generated in Step 100 exceeds a pre-determined value. This step may, as a non-limiting example, be performed by a Merchant's website. Accordingly, the Merchant (or a Hosting Provider on behalf of the Merchant) may determine a minimum Transaction Trust Rating that must be met before an eCommerce transaction is processed. Conversely, automated purchasing software (perhaps with a corporate purchasing department) may decline to purchase goods or services from a Merchant should the Transaction Trust Rating fail to exceed a pre-determined value. Step 400 also may be performed manually, e.g., a Customer declining a purchase based on the Transaction Trust Rating.

Figure 5:
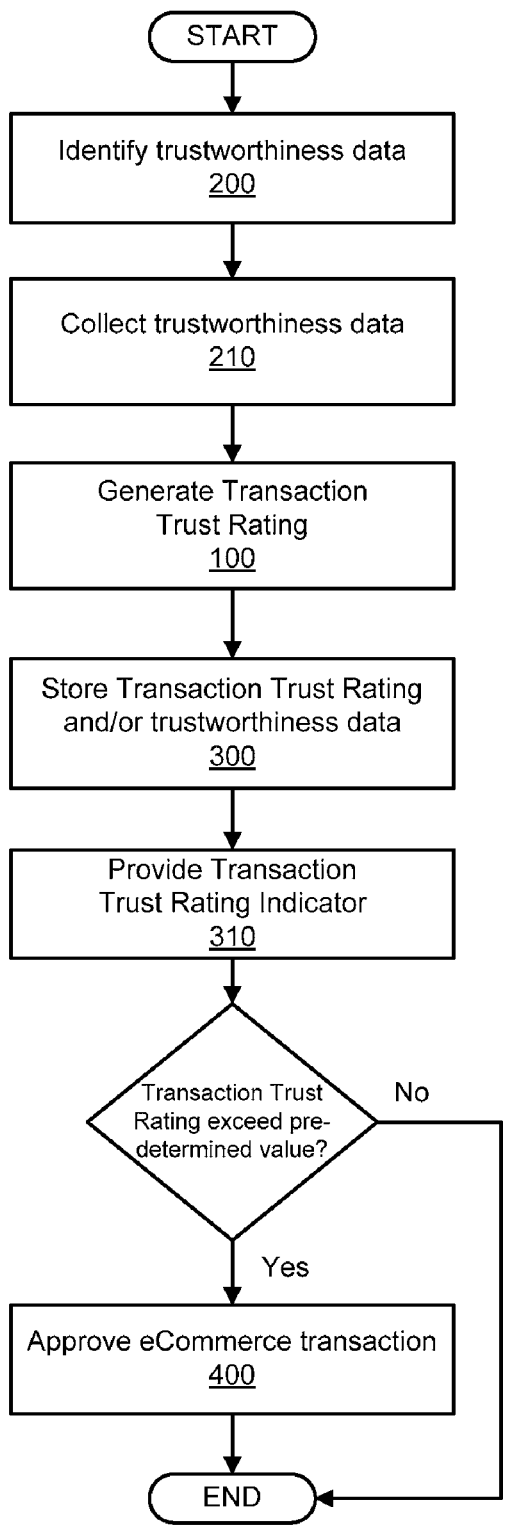
FIG. 5 is a flow diagram illustrating a possible embodiment of a method for rating and validating eCommerce Transactions.

In the embodiment illustrated in FIG. 5, a plurality of data indicating the trustworthiness of a Hosting Provider, a Merchant, and/or a Customer is identified (Step 200) and collected (Step 210), a Transaction Trust Rating for an eCommerce transaction is generated (Step 100), said Transaction Trust Rating and/or said plurality of data is stored (Step 300), perhaps in a Trust Rating Database accessible to a plurality of Internet Users via the Internet, a Transaction Trust Rating Indicator is provided (Step 310) to said Hosting Provider, said Merchant, and/or said Customer, and an eCommerce transaction is approved (Step 400) if said Transaction Trust Rating exceeds a pre-determined value.

Validating eCommerce Transactions

Figure 6:
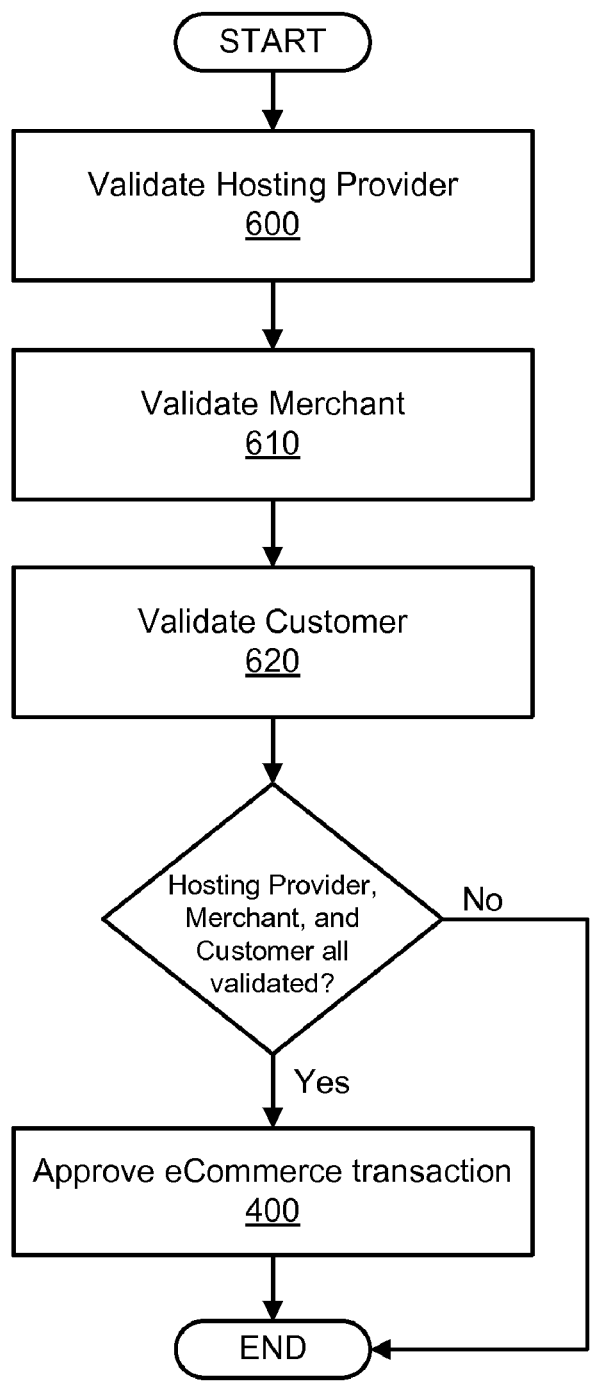
FIG. 6 is a flow diagram illustrating a possible embodiment of a method for validating eCommerce Transactions.

Several different methods may be used to validate eCommerce transactions. The streamlined example embodiment illustrated in FIG. 6 comprises the steps of validating a Hosting Provider (Step 600), validating a Merchant who may be using the Hosting Provider to host an eCommerce website (Step 610), validating a Customer who may purchase goods or services from the Merchant via the eCommerce website (Step 620), and (if the Hosting Provider, Merchant, and Customer are validated) approving an eCommerce transaction involving the Hosting Provider, Merchant, and/or Customer (Step 400).

Figure 7:
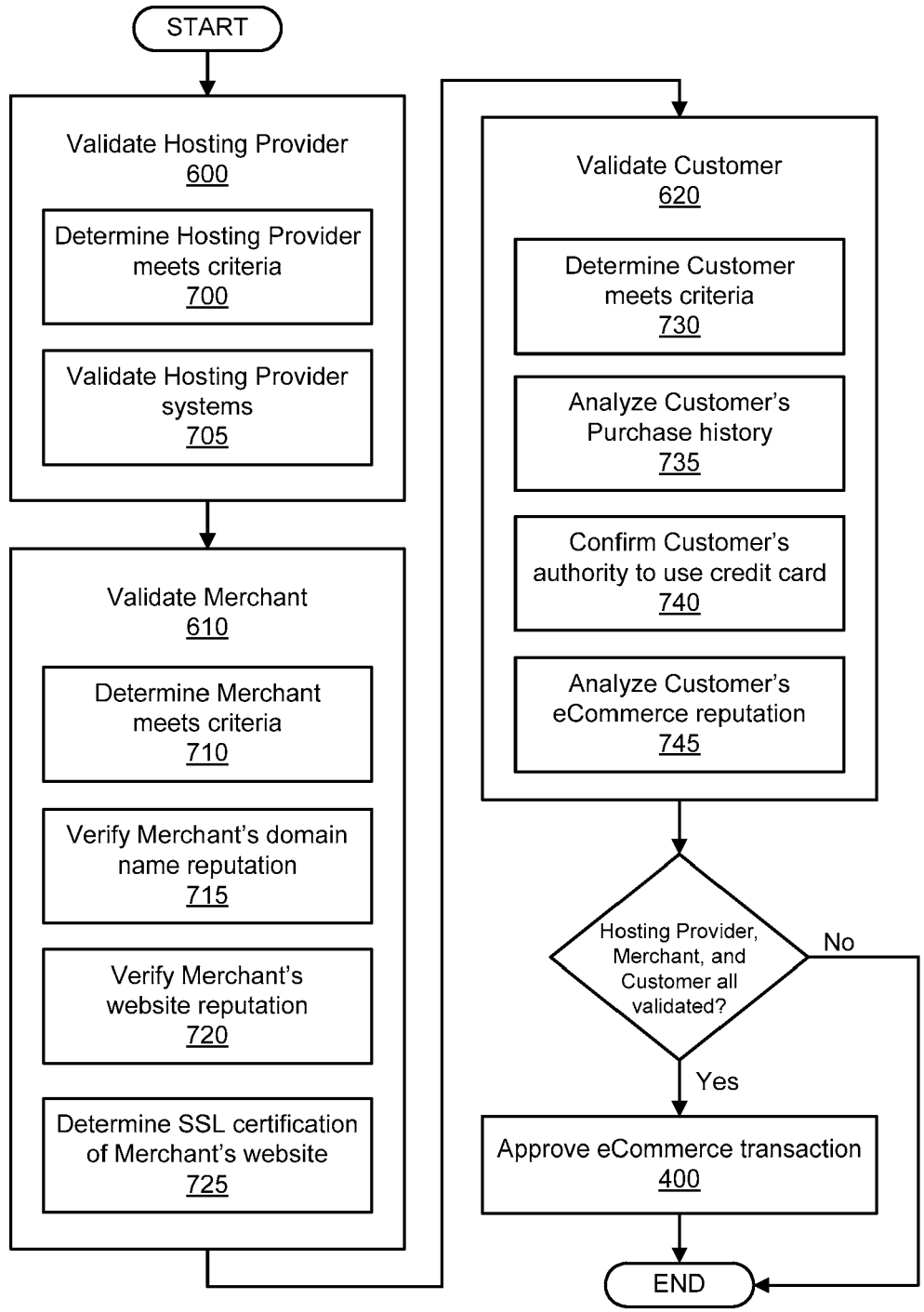
FIG. 7 is a flow diagram illustrating a possible embodiment of a method for validating eCommerce Transactions.

As Illustrated in FIG. 7, the Hosting Provider may be validated (Step 600) by any method of establishing the Hosting Provider's trustworthiness including, but not limited to, determining that the Hosting Provider satisfies a pre-established criteria (Step 700), such as the PCI DSS discussed in detail above. Additionally or alternatively, the security of the Hosting Provider's systems may be validated (Step 705), perhaps by determining whether they have been infiltrated and used by known spammers and/or phishers. Internal information about the Hosting Provider, such as IP address used, results of internal and external scans, security team availability, and system log data, are all types of information that may be collected. External data points provided by organizations such as SHADOW SERVER and TEAM CYMRU also may be used to identify infected systems within the Hosting Provider.

The Merchant may be validated (Step 610) by any method of establishing the Merchant's trustworthiness including, but not limited to determining that said Merchant satisfies a pre-established criteria (Step 710). By way of example, the pre-established criteria may comprise the Merchant's registration and/or rating with the Better Business Bureau, incorporation as a governmentally-recognized corporation, and/or registration and/or rating with an online rating service (e.g., EBAY, AMAZON, and/or GOOGLE seller ratings). Additionally or alternatively, the reputation of a domain name registered to the Merchant may be verified (Step 715). If the Merchant has registered a domain name, a domain name validation analysis (such as GODADDY.COM's CERTIFIED DOMAIN process) may be completed to identify the individual or entity that registered the domain name and determine their reputation. The domain name registrant also may be validated via credit card fraud detection. The reputation of a website operated by the Merchant (Step 720) also may be evaluated in a similar manner. Determining whether a website operated by the Merchant is SSL-certified (Step 725) is yet another, easy to accomplish, method of validating a Merchant. SSL certificates are usually displayed on a Merchant's website and typically indicate that the Merchant's website utilizes at least some level of secure communications protocol.

The Customer may be validated (Step 620) by any method of establishing the Customer's trustworthiness including, but not limited to, determining that the Customer satisfies a pre-established criteria (Step 730), perhaps a minimum credit score. Alternatively, the Customer's purchase history and/or eCommerce reputation may be analyzed (Steps 735 and 745), possibly by reviewing their registration and/or rating with an online rating service (e.g., EBAY, AMAZON, and/or GOOGLE purchaser ratings). Confirming that the Customer is authorized to use a credit card (Step 740) is another available method of validating the Customer.

Other embodiments and uses of the above inventions will be apparent to those having ordinary skill in the art upon consideration of the specification and practice of the invention disclosed herein. The specification and examples given should be considered exemplary only, and it is contemplated that the appended claims will cover any other such embodiments or modifications as fall within the true scope of the invention.

All of the methods disclosed herein may be performed manually, partially automated, or fully automated. The methods also may be embodied in computer-readable media with instructions executable by a processor, which when executed by the processor, causes said processor to perform the steps of each method.

The Abstract accompanying this specification is provided to enable the United States Patent and Trademark Office and the public generally to determine quickly from a cursory inspection the nature and gist of the technical disclosure and in no way intended for defining, determining, or limiting the present invention or any of its embodiments.

The invention claimed is:

1. A method, comprising the steps of:
   a) validating, by at least one server computer, the trustworthiness of a Hosting Provider by confirming that one or more computer systems of said Hosting Provider are secure, wherein said Hosting Provider comprises an entity providing website hosting services to third parties;
   b) validating, by said at least one server computer, the trustworthiness of a Merchant using said Hosting Provider to host an eCommerce website resolving from a domain name by confirming that said domain name is registered to said Merchant;
   c) validating, by said at least one server computer, the trustworthiness of a Customer attempting to purchase goods or services from said Merchant via said eCommerce website; and
   d) responsive to a determination that said Hosting Provider, said Merchant, and said Customer are validated, approving, by said at least one server computer, an eCommerce transaction involving said Hosting Provider, said Merchant, and said Customer.

2. The method of claim 1, wherein step a) further comprises the step of determining, by said at least one server computer, that said Hosting Provider satisfies a pre-established criteria.

3. The method of claim 2, wherein said pre-established criteria comprises the Payment Card Industry Data Security Standard.

4. The method of claim 1, wherein step b) further comprises the step of determining, by said at least one server computer, that said Merchant satisfies a pre-established criteria.

5. The method of claim 1, wherein step b) further comprises the step of verifying, by said at least one server computer, the reputation of a domain name registered to said Merchant.

6. The method of claim 1, wherein step b) further comprises the step of verifying, by said at least one server computer, the reputation of a website operated by said Merchant.

7. The method of claim 1, wherein step b) comprises the step of determining, by said at least one server computer, whether a website operated by said Merchant is SSL-certified.

8. The method of claim 1, wherein step c) further comprises the step of determining, by said at least one server computer, that said Customer satisfies a pre-established criteria.

9. The method of claim 1, wherein step c) further comprises the step of analyzing, by said at least one server computer, said Customer's purchase history.

10. The method of claim 1, wherein step c) further comprises the step of confirming, by said at least one server computer, said Customer is authorized to use a credit card.

11. The method of claim 1, wherein step c) further comprises the step of analyzing, by said at least one server computer, said Customer's eCommerce reputation.

* * * * *